United States Patent
Harada et al.

(10) Patent No.: US 8,535,032 B2
(45) Date of Patent: Sep. 17, 2013

(54) FILM STRETCHER

(75) Inventors: Hiroshi Harada, Toyota (JP); Hiroshi Suzuki, Miyoshi (JP); Toshiaki Kenmotsu, Hatano (JP)

(73) Assignees: Toyota Jidosha Kabushiki Kaisha, Toyota-shi, Aichi-ken (JP); Tokiwa Seisakusho Co., Ltd., Kanagawa (JP)

( * ) Notice: Subject to any disclaimer, the term of this patent is extended or adjusted under 35 U.S.C. 154(b) by 223 days.

(21) Appl. No.: 13/125,073

(22) PCT Filed: Aug. 13, 2009

(86) PCT No.: PCT/IB2009/006536
§ 371 (c)(1),
(2), (4) Date: Apr. 20, 2011

(87) PCT Pub. No.: WO2010/046738
PCT Pub. Date: Apr. 29, 2010

(65) Prior Publication Data
US 2011/0200702 A1 Aug. 18, 2011

(30) Foreign Application Priority Data
Oct. 22, 2008 (JP) ................................. 2008-272180

(51) Int. Cl.
*B29C 55/08* (2006.01)
(52) U.S. Cl.
USPC ..... 425/66; 425/363; 425/DIG. 48; 425/DIG. 53; 425/397; 264/290.2; 264/288.4
(58) Field of Classification Search
USPC ............. 264/66, 363, 383, DIG. 48, DIG. 53, 264/397; 425/290.2, 288.4
See application file for complete search history.

(56) References Cited

U.S. PATENT DOCUMENTS 2,545,868 A * 3/1951 Bailey ........................ 264/210.7
2,895,171 A 7/1959 Holmes-Walker et al.
(Continued)

FOREIGN PATENT DOCUMENTS

CN 1285425 2/2001
DE 3621205 1/1988
(Continued)

OTHER PUBLICATIONS

International Search Report in International Application No. PCT/IB2009/006536; Mailing Date: Nov. 23, 2009.
(Continued)

*Primary Examiner* — Joseph S Del Sole
*Assistant Examiner* — Nahida Sultana
(74) *Attorney, Agent, or Firm* — Finnegan, Henderson, Farabow, Garrett & Dunner, LLP

(57) ABSTRACT

A film stretcher that transports a film material in a predetermined transport direction while holding an end of the film material in a width direction of the film material to stretch the film material in the width direction includes a holding unit that includes a stretching roll having an annular groove formed on an outer periphery of the stretching roll and an endless wire fitted in the annular groove over a predetermined rotation angle range of the annular groove in a circular arc shape so that the end of the film material in the width direction of the film material is pinched. The stretching roll is inclined so as to open toward a downstream side in the transport direction of the film material. The holding unit transports the film material in the transport direction while pinching the film material using the stretching roll and the endless wire, whereby the film material is stretched in the width direction.

8 Claims, 11 Drawing Sheets

(56) References Cited

U.S. PATENT DOCUMENTS

| | | | |
|---|---|---|---|
| 3,932,919 A * | 1/1976 | Hutzenlaub | 26/73 |
| 4,017,227 A * | 4/1977 | Schmidt | 425/66 |
| 5,106,555 A * | 4/1992 | Kobayashi et al. | 264/112 |
| 5,875,616 A * | 3/1999 | Paavola et al. | 53/556 |
| 2003/0082977 A1 | 5/2003 | Kuroiwa et al. | |
| 2013/0115396 A1* | 5/2013 | Borchardt | 428/35.5 |

FOREIGN PATENT DOCUMENTS

| | | |
|---|---|---|
| EP | 0 449 548 A | 10/1991 |
| EP | 0 672 516 A | 9/1995 |
| EP | 1 079 013 A | 2/2001 |
| JP | 5-51004 | 3/1993 |
| JP | 11-277621 | 10/1999 |
| JP | 2004-67804 | 3/2004 |
| JP | 2005-171171 | 6/2005 |
| JP | 2007-261066 | 10/2007 |

OTHER PUBLICATIONS

Written Opinion of the International Searching Authority in International Application No. PCT/IB2009/006536; Mailing Date: Nov. 23, 2009.

Applicant's Response to Written Opinion in International Application No. PCT/IB2009/006536; Mar. 8, 2010.

Notification of Reason(s) for Refusal in Japanese Patent Application No. 2008-272180; Drafting Date: Aug. 20, 2010.

* cited by examiner

FILM STRETCHER

CROSS-REFERENCE TO RELATED APPLICATIONS

This application is a national phase application of International Application No. PCT/IB2009/006536, filed Aug. 13, 2009, and claims the priority of Japanese Application No. 2008-272180, filed Oct. 22, 2008, the contents of both of which are incorporated herein by reference.

BACKGROUND OF THE INVENTION

1. Field of the Invention

The invention relates to a film stretcher that stretches a film material having a film-like shape, sheet-like shape, or the like.

2. Description of the Related Art

Japanese Patent Application Publication No. 2004-67804 (JP-A-2004-67804) describes a film stretcher (tenter type). The film stretcher includes chains having a large number of holding means, such as clips, on both sides of a film. Both ends of the film are held by the clips provided for the chains. The chains on both sides of the film are driven along respective guide rails, that is, in a direction to widen the film in the width direction. In this manner, the film stretcher stretches the film.

However, in the above film stretcher, the film is stretched in such a manner that both ends of the film are held by the clips that are located at intervals in the direction in which the film is driven (transported). Thus, stretching stress concentrates on portions near the clips. For this reason, the film is stretched ununiformly at portions near the clips, and, by extension, perforation is formed in the film. This causes a neck-in (contraction in the film width direction) between the adjacent clips. Hence, it is considerably difficult to reduce the thickness of the film.

SUMMARY OF THE INVENTION

The invention provides a film stretcher that is able to easily reduce the thickness of a film without a nonuniform stretch or a neck-in.

An aspect of the invention relates to a film stretcher that transports a film material in a predetermined transport direction while holding an end of the film material in a width direction of the film material to stretch the film material in the width direction. The film stretcher includes a holding unit that includes a stretching roll having an annular groove formed on an outer periphery of the stretching roll and a holding wire material that is fitted in the annular groove over a predetermined rotation angle range of the annular groove in a circular arc shape so that the end of the film material in the width direction of the film material is pinched, wherein the stretching roll is inclined so as to open toward a downstream side in the transport direction of the film material, and the holding unit transports the film material in the transport direction while pinching the film material using the stretching roll and the holding wire material, whereby the film material is stretched in the width direction. The film material may be a resin used for a separation membrane, an optical film, a packaging material, a clothing material, a heat insulating material, an insulating material, or the like. The resin may be, for example, polyethylene, polytetrafluoroethylene, polyamide, polypropylene, polyvinyl alcohol, polyvinyl chloride resin, nylon (product name), polystyrene, polyester or polyethylene terephthalate. The holding wire material may be a metal, such as stainless steel, iron, aluminum, tungsten and brass, a resin, such as nylon (product name), vinylon, polyester, polyethylene, polypropylene, polytetrafluoroethylene and acrylic resin, a wire material made of carbon fiber, hemp or cotton, or the like. Particularly, the holding wire material may be formed of a wire, a belt, or the like, made of any one of these wire materials. The holding unit may be provided at least on one of the ends of the film material in the width direction of the film material. With the above configuration, it is possible to provide a film stretcher that is able to easily reduce the thickness of the film material without a nonuniform stretch or a neck-in.

In the above aspect, a pinching force with which the film material is pinched by the stretching roll and the holding wire material may be adjustable. With the above configuration, it is possible to adjust the pinching force applied to the film material.

In addition, in the above aspect, the holding unit may be provided on both sides of the film material in the width direction. With the above configuration, the film material may be stretched at a high magnification ratio by transporting the film material once.

In the above aspect, the holding wire material may be an endless holding wire material that is wound around a plurality of transport rolls of which rotation axes are arranged along a concentric circle of the stretching roll at a predetermined angular interval, and the plurality of transport rolls may be arranged so that outer peripheral surfaces of the respective transport rolls face the annular groove with the end of the film material in the width direction of the film material interposed therebetween. With the above configuration, by changing the positions (angles) of the transport rolls with respect to the stretching roll, it is possible to control stretching start and end positions in the stretching locus. Thus, it is possible to vary a sketching speed (magnification ratio) within a stretching section.

In the above aspect, the film stretcher may further include a tensioner that is located between any two adjacent transport rolls from among the plurality of transport rolls, and that presses the holding wire material from an outer peripheral side of the holding wire material to adjust tension of the holding wire material, whereby the tensioner may adjust the pinching force. With the above configuration, the tension of the endless wire may be adjusted, and the thickness of the film material may be tracked while ensuring a certain holding force applied to the film material. Thus, it is possible to stretch a thin film. The tensioner is able to suppress a decrease in pinching force of the holding wire material due to a reduction in thickness of the film material in accordance with a stretch of the film material.

In the above configuration, the endless holding wire material may be an endless wire or an endless belt. With the above configuration, the film material may be reliably pinched by the stretching roll and the endless holding wire material.

In the above configuration, the stretching roll may be arranged at a predetermined camber angle. With the above configuration, it is possible to set a predetermined stretching locus by setting a predetermined camber angle.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1A:
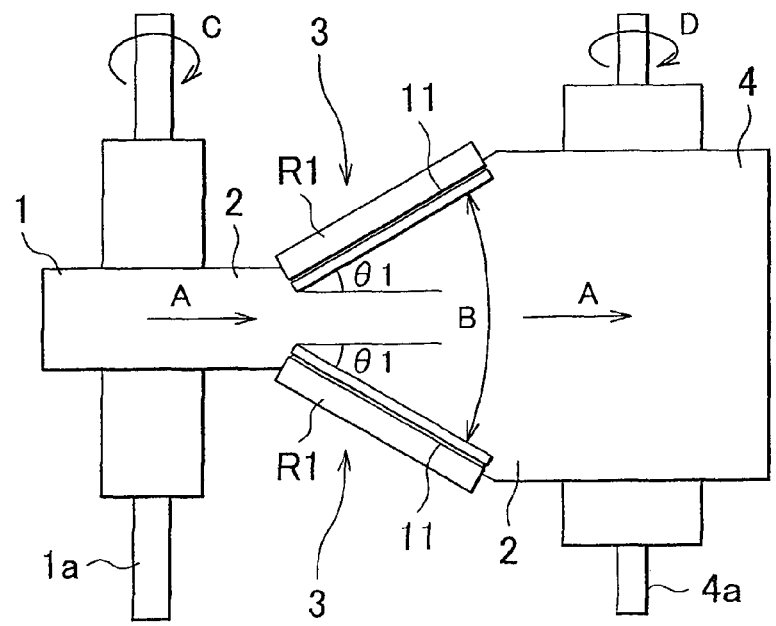
FIG. 1A is a top view that schematically shows a film stretcher according to an embodiment of the invention.
Figure 1B:
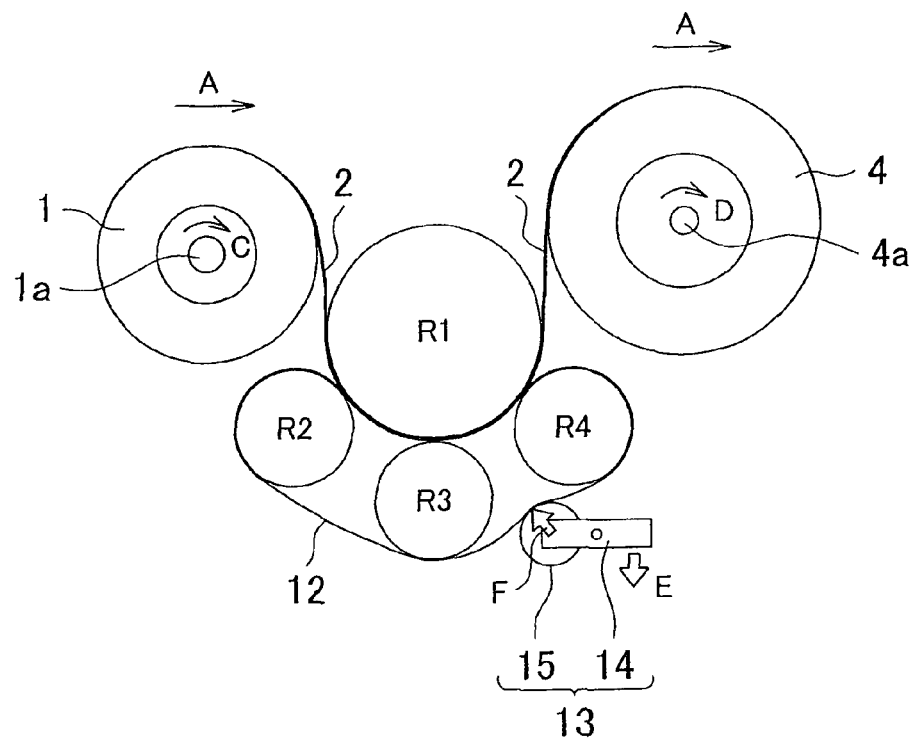
FIG. 1B is a left side view that schematically shows the film stretcher.

Hereinafter, a film stretcher according to an embodiment of the invention will be described with reference to the accompanying drawings. Note that like reference numerals denote like or corresponding components among the drawings. FIG. 1A is a top view that schematically shows the film stretcher according to the embodiment of the invention. FIG. 1B is a left side view that schematically shows the film stretcher, that is, as viewed from the lower side of FIG. 1A. As shown in FIG. 1A and FIG. 1B, the film stretcher according to the present embodiment transports a film material 2, which is unrolled from a film material supply roll 1 in a sheet-like shape, in one direction, that is, rightward (arrow A direction) in the example of the drawing, while holding both ends of the film material 2 in the width direction of the film material 2 by holding units 3. Thus, the film stretcher gradually widens the film material 2 in the width direction by the holding units 3 to stretch the film material 2. In the illustrated example, the holding units 3 are provided respectively on both right and left sides (upper and lower sides in FIG. 1A) of the film material 2 and then both ends of the film material 2 in the width direction of the film material 2 are held respectively by the holding units 3. Thus, the film material 2 is widened in the width direction (see arrow B) by the holding units 3 on both sides in the width direction, that is, the right and left sides in the width direction of the film material. Note that the stretched film material 2 is taken up by a film material take-up roll 4. Note that the arrows C and D in FIG. 1B respectively indicate directions in which a shaft 1a of the roll 1 and a shaft 4a of the roll 4 rotate.

Figure 2:
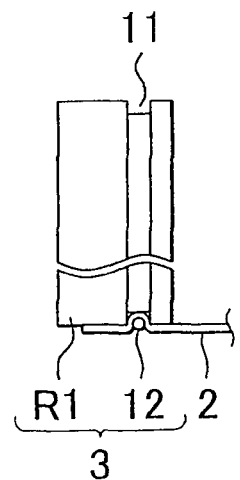
FIG. 2 is a view that shows a state where a holding wire material is fitted in an annular groove of each stretching roll of the film stretcher shown in FIG. 1B.

As shown in FIG. 1B, each holding unit 3 includes a stretching roll R1 and a holding wire material 12. The stretching roll R1 has an annular groove 11 formed on the outer periphery of the stretching roll R1. The holding wire material 12 is fitted in the annular groove 11 over a predetermined rotation angle range of the annular groove 11 in a circular arc shape so that the end of the film material 2 in the width direction of the film material 2 is pinched. Note that FIG. 2 shows a state where the holding wire material 12 is fitted in the annular groove 11 while the end of the film material 2 in the width direction of the film material 2, that is, the left end of the film material 2 in the illustrated example, is pinched in the annular groove 11 of the stretching roll R1.

Here, the stretching rolls R1 are inclined so as to open the stretching rolls R1 toward a downstream side in a transport direction of the film material 2 (see θ1 in FIG. 1A). The stretching rolls R1 transport the film material 2 in one direction, that is, rightward in the illustrated example, while pinching the film material 2 using the stretching rolls R1 and the holding wire materials 12. Thus, the film material 2 is widened in the width direction to stretch the film material 2. In addition, each of the holding wire materials 12 is, for example, formed of an endless wire or an endless belt. Here, each holding wire material 12 is formed of an endless wire. Each of the endless wires 12 is wound around a plurality of transport rolls R2 to R4 (three in the illustrated example). The rotation axes of the respective transport rolls R2 to R4 are arranged along a concentric circle of the stretching roll R1 at predetermined angular intervals. These three transport rolls R2 to R4 are arranged so that the respective outer peripheral surfaces face the annular groove 11 of the outer periphery of the stretching roll R1 with the end of the film material 2 in the width direction of the film material 2 interposed therebetween. Thus, each endless wire (holding wire material) 12 is fitted over a predetermined rotation angle range of the annular groove 11 of the stretching roll R1 in a circular arc shape. Note that the outer peripheries of the transport rolls R2 to R4, around which the endless wire 12 is wound, have annular grooves (not shown) having a size that does not interfere with the function of stretching the film material 2 in cooperation with the stretching roll R1. This is to prevent each endless wire 12 from dropping off from the transport rolls R2 to R4. Note that the annular grooves may be provided only for the transport rolls R2 and R4.

As described above, the film material 2 is pinched by the stretching rolls R1 and the endless wires 12. At this time, a pinching force applied to the film material 2 is adjustable, and a tensioner 13 is provided for adjusting the pinching force. The tensioner 13 is located between any two transport rolls among the three transport rolls R2 to R4, that is, between the transport rolls R3 and R4 in the illustrated example. The tensioner 13 presses the endless wire 12 from the outer peripheral side to adjust tension of the endless wire 12, thus allowing the pinching force to be adjustable. Note that adjusting the tension of the endless wire 12 by the tensioner 13 may also be carried out by pressing the endless wire 12 from the inner peripheral side. In the embodiment shown in FIG. 1B, as the power of the tensioner 13 is turned on, a lever 14 is driven in the arrow E direction to move a pulley 15 in the arrow F direction. The pulley 15 presses the endless wire 12 from the outer peripheral side to tighten the tension of the endless wire 12 or to uniform the pinching force. Note that the upper holding unit 3 between the pair of upper and lower holding units 3 in FIG. 1A is also configured similarly as shown in FIG. 1B (the side view (right side view) of the upper holding unit 3 is shown when FIG. 1B is viewed clearly from the rear surface side).

Next, the operation of the present embodiment will be described. As shown in FIG. 1A, the film material (work) 2 before stretching is unrolled from the film material supply roll 1 in a sheet-like shape, and is transported in the arrow A direction so that both ends of the film material 2 in the width direction of the film material 2 are respectively held by the holding units 3, specifically, pinched between the annular grooves 11 of the stretching rolls R1 and the holding wire materials 12. The stretching rolls R1 are inclined (see θ1 in FIG. 1A) so as to open toward the downstream side in the transport direction of the film material 2. Thus, the film material 2 is transported in the arrow A direction while being widened, that is, being stretched, in the width direction indicated by the arrow B in FIG. 1A. The stretched film material 2 is taken up by the film material take-up roll 4.

Figure 3:
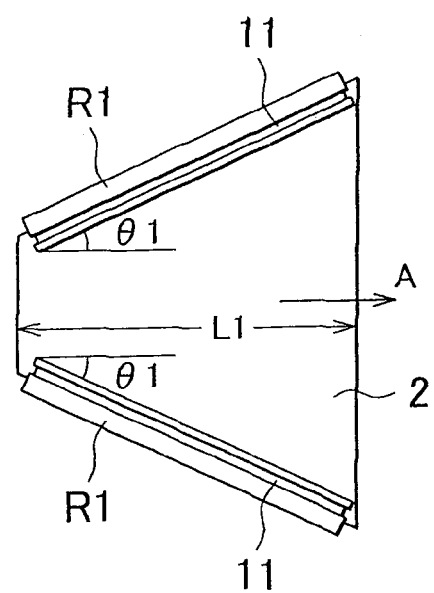
FIG. 3 is an enlarged view of the stretching rolls shown in FIG. 1A.
Figure 4:
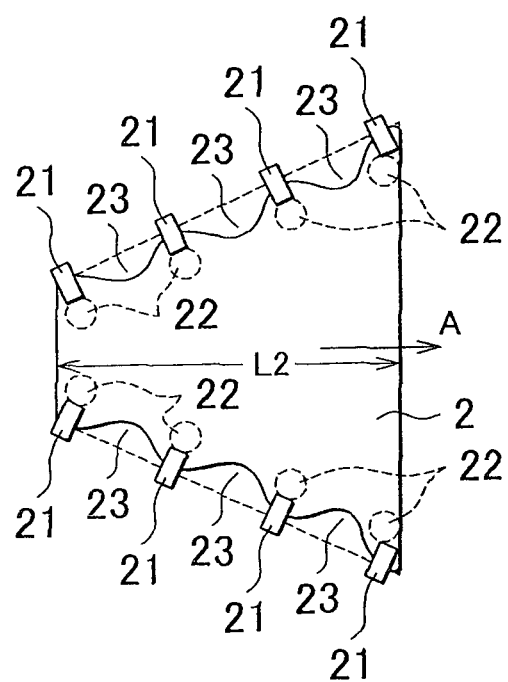
FIG. 4 is a view that shows a relevant portion of a film stretcher according to a related art.

FIG. 3 is an enlarged view of the stretching rolls R1 shown in FIG. 1A. FIG. 4 is a view that schematically shows a film stretcher according to a related art. As shown in FIG. 4, when the film material 2 is held by clips 21, the film material 2 is held by the clips 21 that are arranged at intervals within a stretching range L2, that is, uncontinuously held (in a dot-like manner). In contrast, as shown in FIG. 3, when the film material 2 is held by the stretching rolls R1, the film material 2 is held continuously over a range (stretching range) that is pinched between the annular grooves 11 of the stretching rolls R1 and the holding wire materials 12, for example, nearly the overall length of L1, that is, in a linear manner. Thus, in the present embodiment, a nonuniform stretch near the clips 21 shown in FIG. 4 (areas 22 surrounded by dotted lines in the drawing indicate main locations of the nonuniform stretch) or a neck-in between the adjacent clips 21 (see the reference numerals 23 in the drawing) do not occur in FIG. 3. Thus, the thickness of the film material 2 may be easily reduced. Particularly, by controlling the tension of the endless wires 12 with the tensioners 13, the thickness of the film material 2 may be tracked while ensuring a certain holding force. Thus, it is possible to easily stretch a thin film.

Figure 5A:
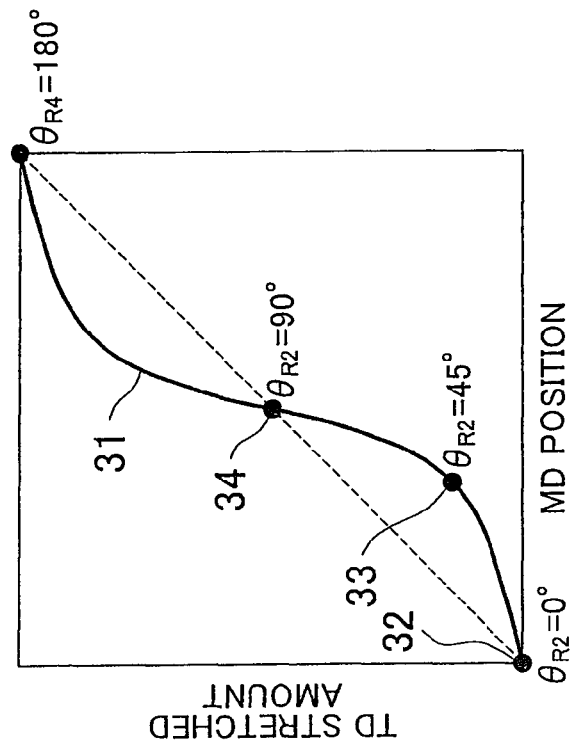
FIG. 5A and FIG. 5B are views that illustrate that a locus of stretching and a stretching start position are controllable by changing the positions of transport rolls with respect to the stretching rolls in the film stretcher shown in FIG. 1A and FIG. 1B.
Figure 5B:
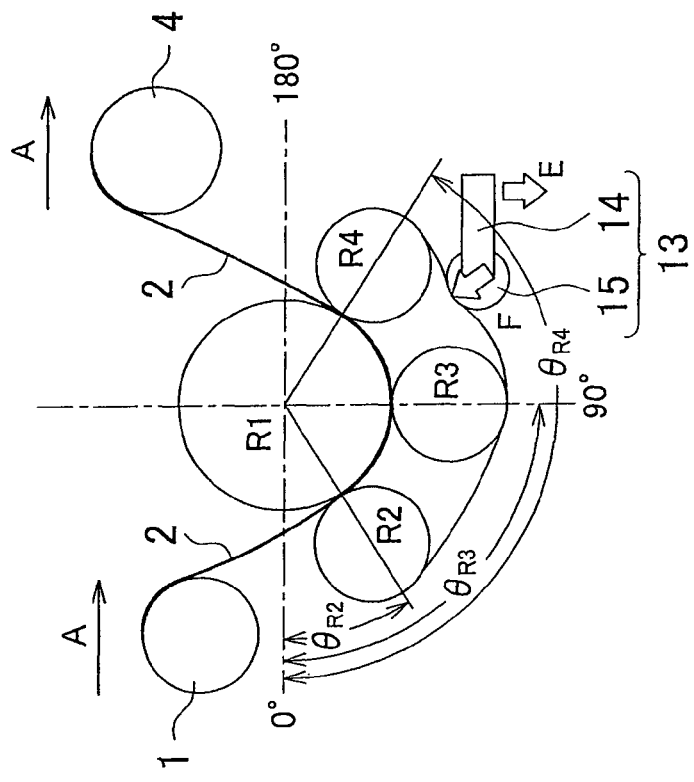

FIG. 5A and FIG. 5B are views that illustrate that a locus of stretching and a stretching start position in the locus of stretching are controllable by changing the positions (angles $\theta_{R2}$ to $\theta_{R4}$) of the transport rolls R2 to R4 with respect to the stretching rolls R1. FIG. 5A shows the positions of the transport rolls R2 to R4 with respect to the stretching roll R1. FIG. 5B shows a stretching locus 31 and a stretching start position 32, 33 or 34 when the position of the transport roll R4 is located at 180° ($\theta_{R4}$=180°) and the transport roll R2 is located at 0°, 45° or 90°. Here, the abscissa axis of FIG. 5B represents an MD (film transport direction) position, and the ordinate axis represents a TD (film width direction) position. Note that FIG. 5A shows the stretching roll R1 (holding unit 3) at the same side as that of FIG. 1B.

Figure 6B:
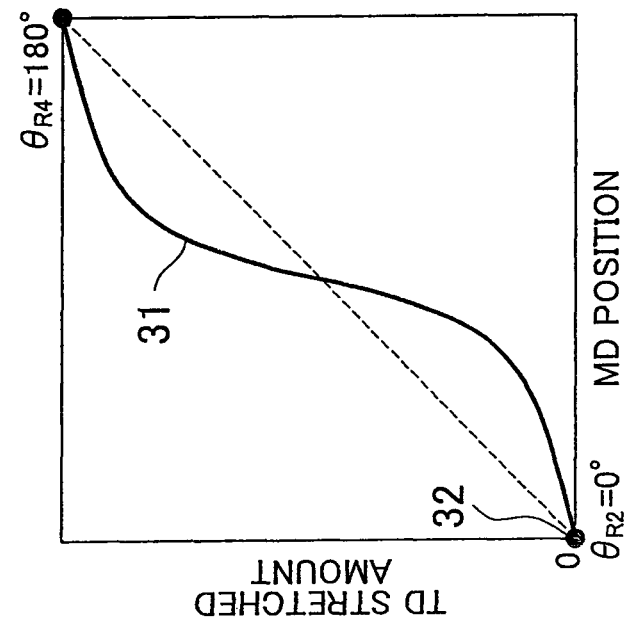
FIG. 6A and FIG. 6B are views that illustrate a locus of stretching and a stretching start position when the transport rolls are positioned at 0° with respect to the stretching rolls.
Figure 6A:
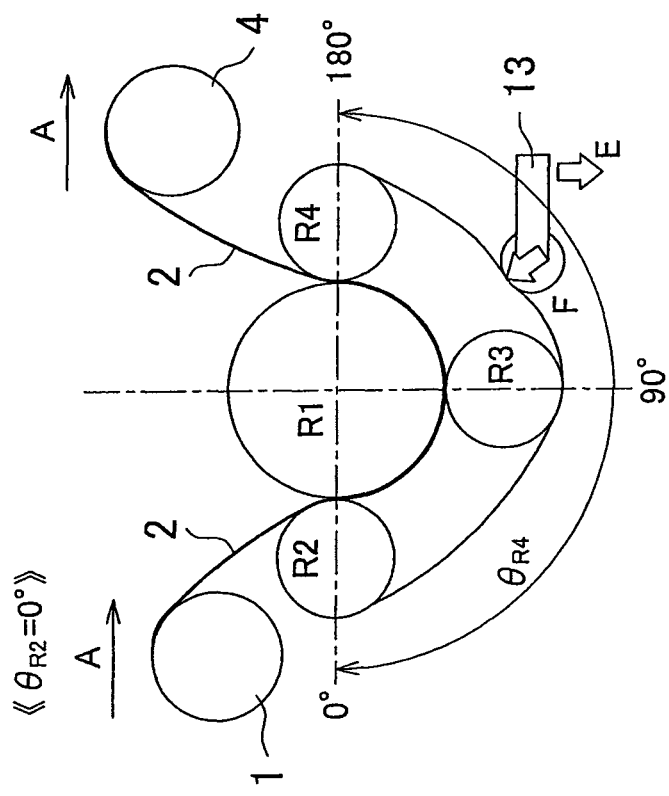
Figure 7B:
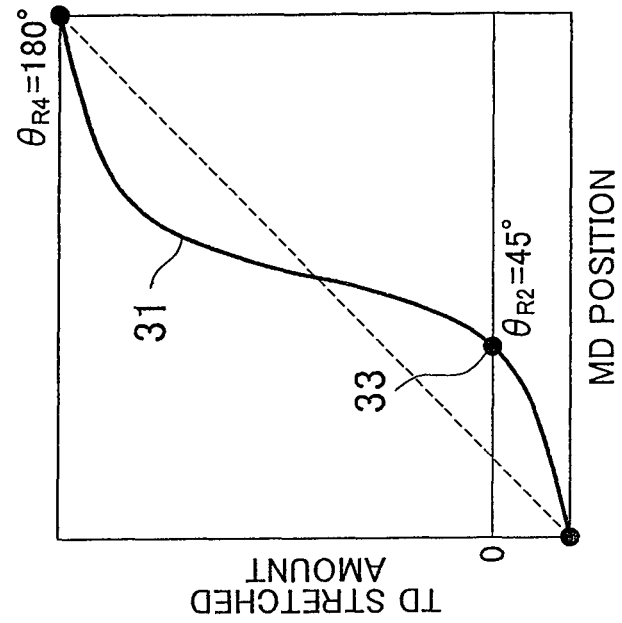
FIG. 7A and FIG. 7B are views that illustrate a locus of stretching and a stretching start position when the transport rolls are positioned at 45° with respect to the stretching rolls.
Figure 7A:
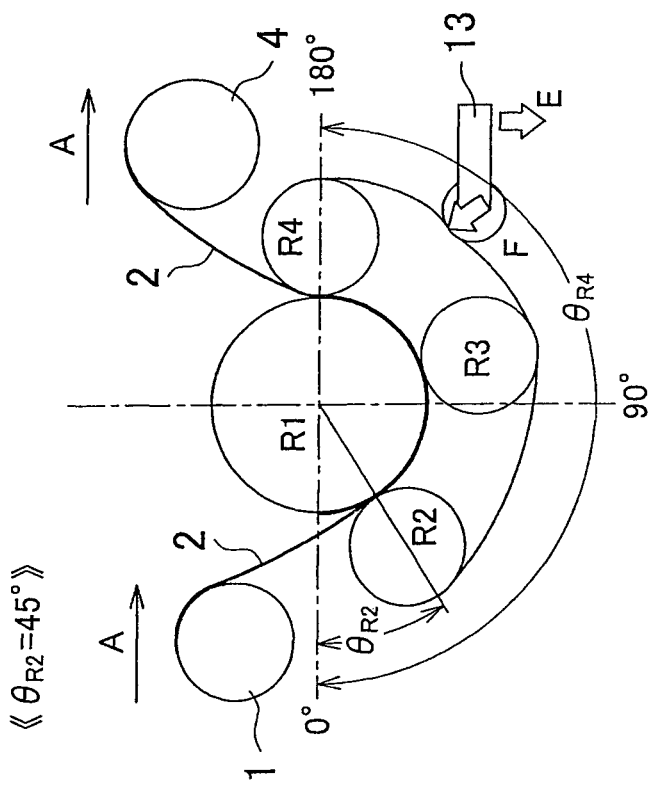
Figure 8B:
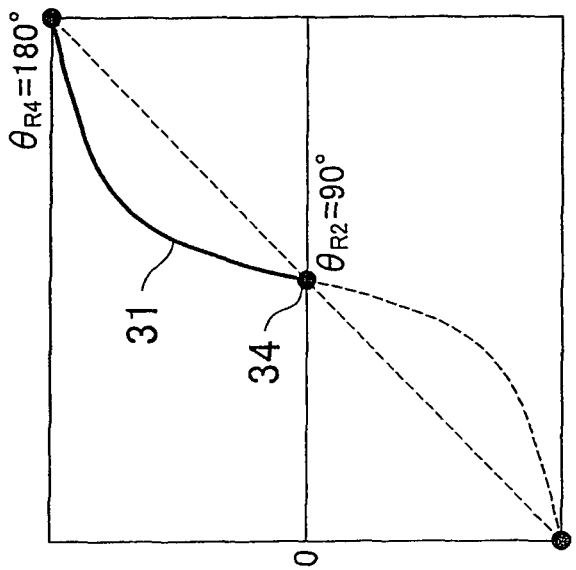
FIG. 8A and FIG. 8B are views that illustrate a locus of stretching and a stretching start position when the transport rolls are positioned at 90° with respect to the stretching rolls.
Figure 8A:
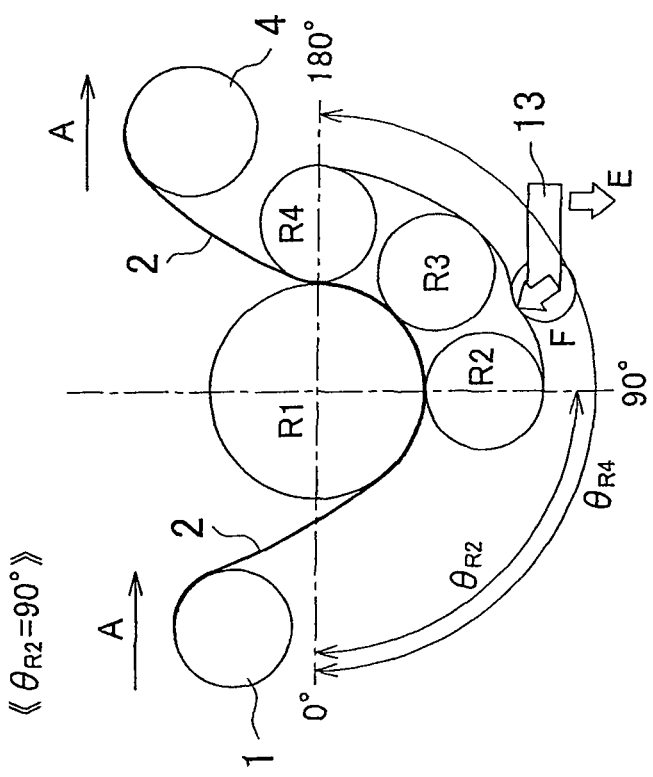

FIG. 6A to FIG. 8B are views that respectively show the positions (0°, 45° and 90°) of the transport roll R2 with respect to the stretching roll R1, which are collectively shown in FIG. 5A and FIG. 5B in correspondence with the stretching start positions 32, 33 and 34 for the sake of easy understanding. In FIG. 6A to FIG. 8B, the transport roll R4 is located at 180° ($\theta_{R4}$=180°). FIG. 6A, FIG. 7A and FIG. 8A each show the position of the transport roll R2 with respect to the stretching roll R1. FIG. 6B shows the stretching locus 31 and the stretching start position 32. FIG. 7B shows the stretching locus 31 and the stretching start position 33. FIG. 8B shows the stretching locus 31 and the stretching start position 34. In this way, in the present embodiment, by changing the positions (angles: $\theta_{R2}$ to $\theta_{R4}$) of the transport rolls R2 to R4 with respect to the stretching roll R1, it is possible to control the stretching start and end positions in the stretching locus. Thus, it is possible to vary a stretching speed (magnification ratio) within a stretching section. A final stretching magnification ratio is set by the angles ($\theta_{R2}$ to $\theta_{R4}$) of the transport rolls R2 to R4.

Figure 9A:
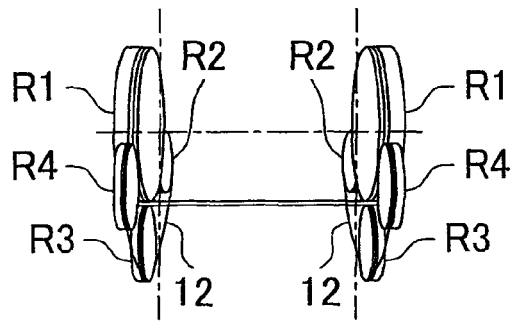
FIG. 9A is a front view that shows a pair of stretching rolls when the stretching rolls have no camber angles.
Figure 9B:
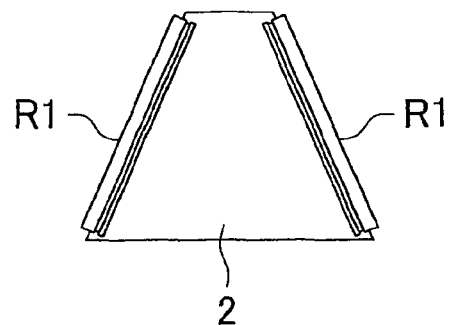
FIG. 9B is a top view that shows the pair of stretching rolls.
Figure 10A:
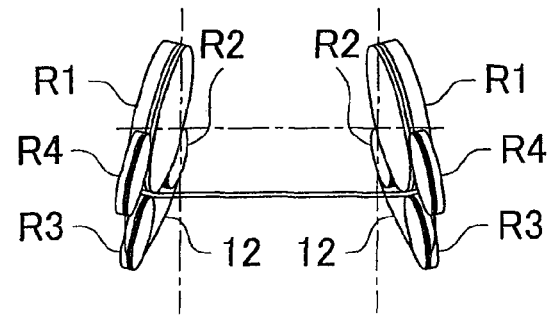
FIG. 10A is a front view that shows a pair of stretching rolls when the stretching rolls have a negative camber.
Figure 10B:
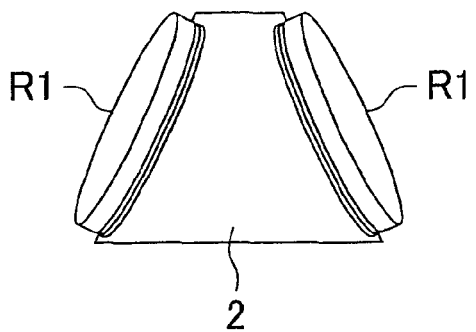
FIG. 10B is a top view that shows the pair of stretching rolls.
Figure 11A:
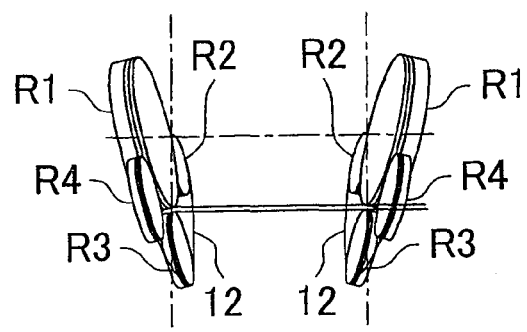
FIG. 11A is a front view that shows a pair of stretching rolls when the stretching rolls have a positive camber.
Figure 11B:
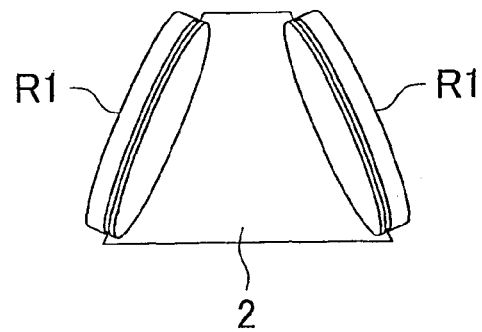
FIG. 11B is a top view that shows the pair of stretching rolls.
Figure 12:
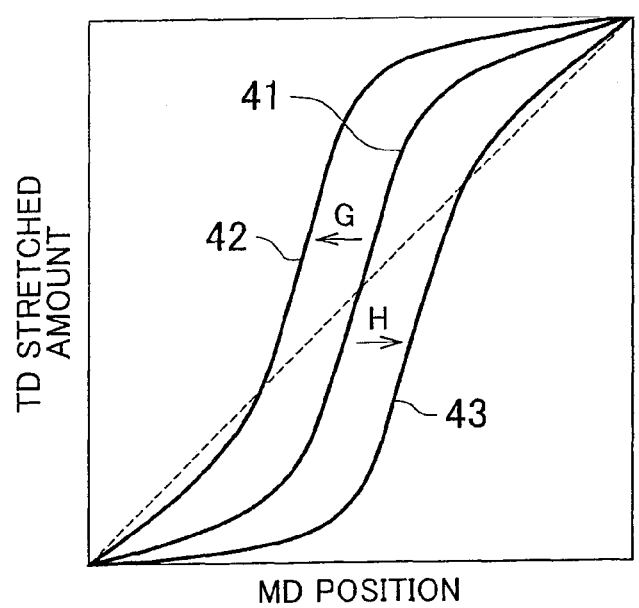
FIG. 12 is a graph that shows stretching loci when the cambers of the stretching rolls are respectively set to no cambers, negative cambers and positive cambers.

In addition, in the present embodiment, the stretching locus may also be controlled by changing the cambers (angles) of the stretching rolls R1. FIG. 9A to FIG. 11B illustrate examples thereof. FIG. 9A, FIG. 9B, FIG. 10A, FIG. 10B, FIG. 11A and FIG. 11B are views that respectively show the pairs of stretching rolls R1 when the cambers of the stretching rolls R1 are set to no cambers, negative cambers and positive cambers. Among the drawings, FIG. 9A, FIG. 10A and FIG. 11A are front views, and FIG. 9B, FIG. 10B and FIG. 11B are top views. Note that FIG. 9A, FIG. 10A and FIG. 11A also show the transport rolls R2 to R4 and the endless wires 12. FIG. 12 is a graph that shows stretching loci when the cambers of the stretching rolls R1 are set to no cambers, negative cambers and positive cambers. FIG. 12 shows a stretching locus 41 in the case of no cambers, a stretching locus 42 in the case of negative cambers and a stretching locus 43 in the case of positive cambers. In addition, the arrows G and H in the drawing show directions in which the stretching locus is changed depending on the type of the cambers set for the stretching rolls R1.

Stretchability requires optimization of stretching conditions (temperature, speed, magnification ratio, and the like) depending on the type and necessary physical properties of the film material 2, so the stretcher is mostly designed for exclusive use. However, according to the present embodiment, as shown in FIG. 5A to FIG. 12, it is possible to control the stretching locus and stretching speed (magnification ratio) within the stretching section, so the film material 2 made of various materials and having various physical properties may be stretched by one apparatus. Note that by changing the camber angles of the stretching rolls R1, the stretching locus may be controlled while the angles ($\theta_{R2}$ to $\theta_{R4}$) of the transport rolls R2 to R4 are constant. When the stretching locus is controlled by this method, the distance of stretching section (depending on a roll rudder angle) of the film material (work) 2 is not reduced, so it is possible to increase a stretching magnification ratio within the same stretching section.

Figure 13:
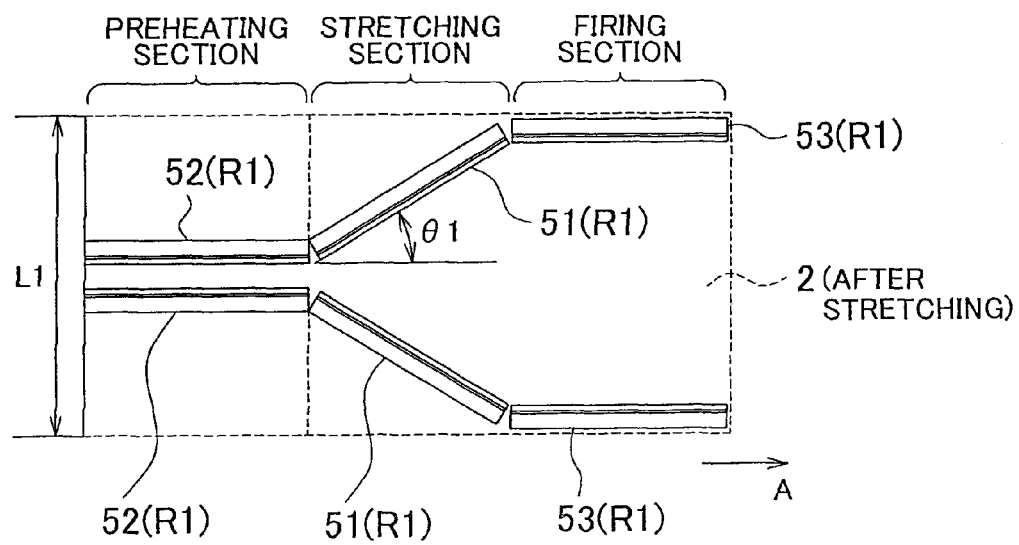
FIG. 13 is a top view that shows a configuration example of the embodiment when a film material is stretched similarly to that of the film stretcher according to the related art.
Figure 14:
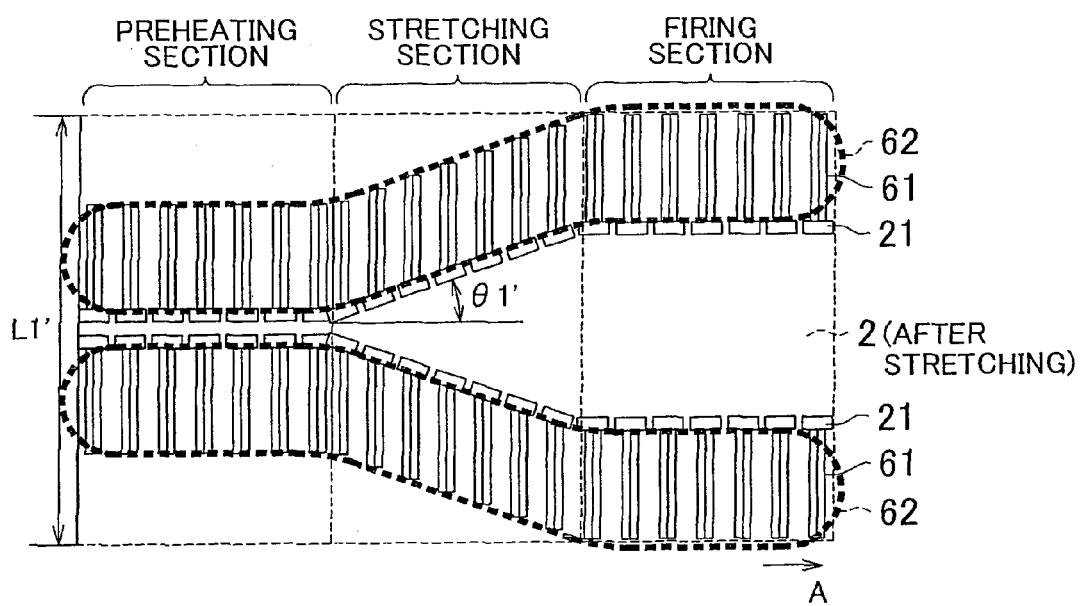
FIG. 14 is a top view that shows the film stretcher according to the related art.

Furthermore, according to the present embodiment, the following advantageous effects may be obtained. FIG. 13 shows a configuration example of the present embodiment when a film material is stretched similarly to that of the related art (tenter type) shown in FIG. 14. In FIG. 13, holding units 51 have a similar configuration to that of the holding units 3 shown in FIG. 1. In addition, holding units 52 and 53 are formed of similar components to those of the holding units 3 shown in FIG. 1, and hold both ends of the film material 2 in the width direction of the film material 2. However, a pair of stretching rolls R1 of the holding units 52 or 53 are arranged parallel to each other (θ1=0°), so the holding units 52 and 53 have the function of feeding the film material 2 in a transport direction A without stretching the film material in the width direction. The film stretcher shown in FIG. 14 holds the film material 2 with the clips 21, so it is difficult to increase the stretching angles θ1' as compared with the stretching angles (angles at which the stretching rolls R1 are open) θ1 shown in FIG. 13 (θ1'<θ1). In the present embodiment shown in FIG. 13, the stretching angles θ1 may be relatively increased, so it is possible to reduce a transport line length (length in the transport direction A). In addition, in the present embodiment shown in FIG. 13, each of the endless wires 12 (see FIG. 1) that hold the film material 2 moves in the same locus, so stretching strokes 61 shown in FIG. 14, that is, space for transport chains 62 is unnecessary. Thus, to obtain an equivalent stretching width, the configuration according to the embodiment shown in FIG. 13 is able to reduce a size in the width direction as compared with the configuration shown in FIG. 14 (L1<L1').

Figure 15:
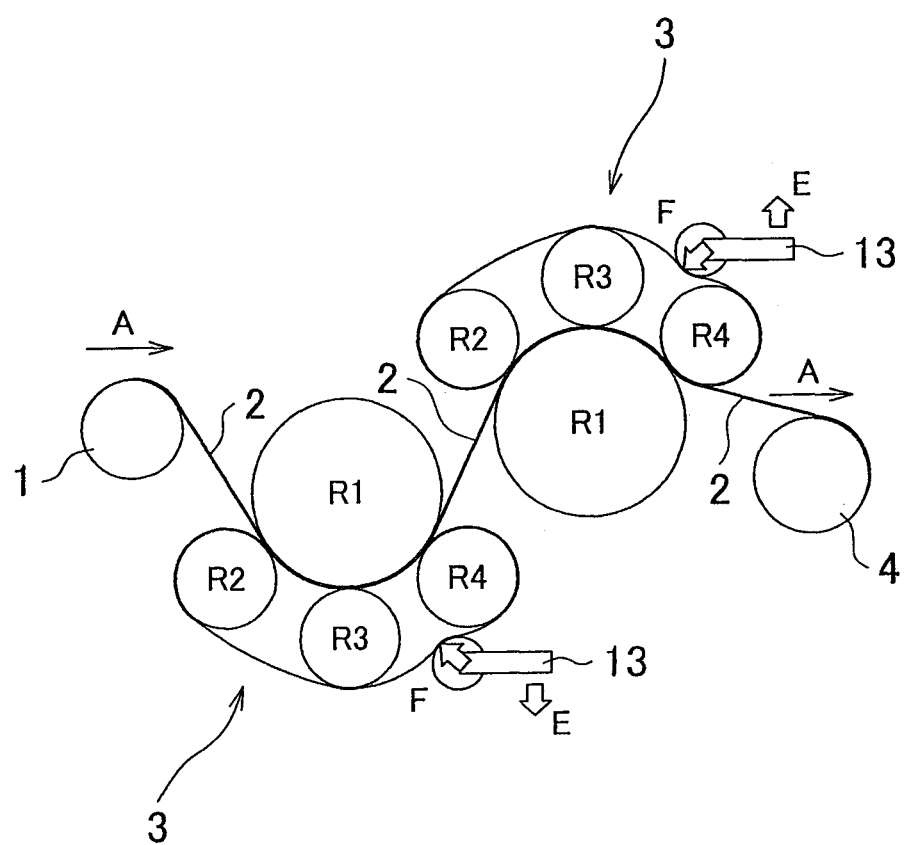
FIG. 15 is a left side view that schematically shows a film stretcher according to another embodiment of the invention.

Note that in the above embodiment, each of the holding units 3 includes the stretching roll R1, the transport rolls R2 to R4, the endless wire 12 and the tensioner 13, and the holding units 3 are respectively provided on both right and left ends of the film material 2 in the width direction of the film material 2; however, the configuration is not limited to this. For example, as shown in FIG. 15, two pairs of holding units 3 may be provided in the transport direction A on both right and left ends of the film material 2 in the width direction of the film material 2. FIG. 15 is a left side view that schematically shows an embodiment of a film stretcher for which two pairs of holding units 3 are provided in the transport direction A on both right and left ends of the film material 2 in the width direction of the film material 2. As shown in the drawing, the two pairs of holding units 3 are arranged in series with each other in the transport direction of the film material 2. According to this embodiment, it is possible to easily increase a magnification ratio at which the film material is stretched, and it is possible to change the magnification ratio, at which the film material is stretched, by one apparatus by a large amount. In addition, by differentiating the rotational speeds (transport speeds) of the two pairs of stretching rolls R1, it is possible to longitudinally stretch the film material 2 between the two pairs of holding units 3. Thus, sequential stretching in multiple steps is possible. When multiple pairs of the holding units 3 are similarly arranged, sequential stretching in multiple steps is possible.

In addition, in the above embodiment, the holding units 3 are respectively provided on both right and left sides in the width direction of the film material 2, the film material 2 is transported while both ends of the film material 2 in the width direction of the film material 2 are being held, and then the film material is widened in the width direction at both ends of the film material 2 in the width direction to stretch the film material. Instead, it is also applicable that the holding unit 3 is provided only on one of the ends of the film material 2 in the width direction, and the film material is stretched at only one side in the width direction of the film material.

The invention claimed is:

1. A film stretcher that transports a film material in a predetermined transport direction while holding an end of the film material in a width direction of the film material to stretch the film material in the width direction, comprising:
    a holding unit that includes a stretching roll having an annular groove formed on an outer periphery of the stretching roll and a holding wire material that is fitted in the annular groove over a predetermined rotation angle range of the annular groove in a circular arc shape so that the end of the film material in the width direction of the film material is pinched,
    wherein the stretching roll is inclined so as to open toward a downstream side in the transport direction of the film material;
    wherein the holding unit transports the film material in the transport direction while pinching the film material using the stretching roll and the holding wire material, whereby the film material is stretched in the width direction;
    wherein the holding wire material is an endless holding wire material that is wound around a plurality of transport rolls of which rotation axes are arranged along a concentric circle of the stretching roll at a predetermined angular interval; and
    wherein the plurality of transport rolls are arranged so that outer peripheral surfaces of the respective transport rolls face the annular groove with the end of the film material in the width direction of the film material interposed therebetween.

2. The film stretcher according to claim 1, wherein a pinching force with which the film material is pinched by the stretching roll is adjustable.

3. The film stretcher according to claim 1, wherein the holding unit is provided on both sides of the film material in the width direction.

4. The film stretcher according to claim 1, further comprising:
    a tensioner that is located between any two adjacent transport rolls from among the plurality of transport rolls, and that presses the holding wire material from an outer peripheral side of the holding wire material to adjust tension of the holding wire material, whereby the tensioner adjusts the pinching force.

5. The film stretcher according to claim 1, wherein a locus along which the film material is stretched is changed by adjusting an angle of a rotation axis of the stretching roll with respect to a vertical direction of the film material.

6. The film stretcher according to claim 1, wherein the stretching roll is arranged at a predetermined camber angle.

7. The film stretcher according to claim 1, further comprising:
    a second holding unit that includes a second stretching roll having a second annular groove formed on an outer periphery of the second stretching roll and arranged downstream of the stretching roll in the transport direction, and a second holding wire material that is fitted in the second annular groove over a predetermined rotation angle range of the second annular groove in a circular arc shape so that an end of the film material in the width direction of the film material is pinched, wherein:
    the second stretching roll is inclined so as to open toward a downstream side in the transport direction of the film material; and
    the second holding unit transports the film material in the transport direction while pinching the film material using the second stretching roll and the second holding wire material, whereby the film material is stretched in the width direction.

8. The film stretcher according to claim 7, wherein a rotational speed of the stretching roll is different from a rotational speed of the second stretching roll.

* * * * *